(12) United States Patent
Bianchi et al.

(10) Patent No.: US 8,985,905 B2
(45) Date of Patent: Mar. 24, 2015

(54) METHOD AND SYSTEM FOR LAYING A PIPELINE ON THE BED OF A BODY OF WATER

(75) Inventors: Stefano Bianchi, Cernusco Sul Naviglio (IT); Massimo Bellin, Mestre (IT)

(73) Assignee: Saipem S.p.A., San Donato Milanese (IT)

( * ) Notice: Subject to any disclaimer, the term of this patent is extended or adjusted under 35 U.S.C. 154(b) by 45 days.

(21) Appl. No.: 14/009,468

(22) PCT Filed: Apr. 6, 2012

(86) PCT No.: PCT/IB2012/051725
§ 371 (c)(1),
(2), (4) Date: Jan. 17, 2014

(87) PCT Pub. No.: WO2012/137184
PCT Pub. Date: Oct. 11, 2012

(65) Prior Publication Data
US 2014/0126962 A1    May 8, 2014

(30) Foreign Application Priority Data

Apr. 6, 2011    (IT) .............................. MI2011A0565

(51) Int. Cl.
| F16L 1/12 | (2006.01) |
| F16L 1/16 | (2006.01) |
| F16L 1/18 | (2006.01) |
| F16L 1/235 | (2006.01) |

(Continued)

(52) U.S. Cl.
CPC . F16L 1/161 (2013.01); F16L 1/18 (2013.01); F16L 1/235 (2013.01); F16L 55/1283 (2013.01); B63B 35/03 (2013.01); F16L 55/26 (2013.01)

USPC ......................................................... 405/168.1

(58) Field of Classification Search
USPC .............. 405/168.1, 168.2, 169, 170; 138/89
See application file for complete search history.

(56) References Cited

U.S. PATENT DOCUMENTS 3,411,307 A * 11/1968 Huitt et al. .................... 405/163
3,747,356 A * 7/1973 Lochridge et al. ......... 405/168.2

(Continued)

FOREIGN PATENT DOCUMENTS

| GB | 2500677 A | * 10/2013 |
| WO | WO 03/042594 | 5/2003 |
| WO | WO 2007/040403 | 4/2007 |

OTHER PUBLICATIONS

International Search Report and Written Opinion for International Application No. PCT/IB2012/051725 dated Jul. 23, 2012.

(Continued)

*Primary Examiner* — Sunil Singh
(74) *Attorney, Agent, or Firm* — Neal, Gerber & Eisenberg LLP

(57) ABSTRACT

A method of laying a pipeline on the bed of a body of water includes constructing, on a laying vessel, a pipeline having pipe sections of a designated or given thickness, and thicker pipe sections distributed along the pipeline; moving the laying vessel forward and laying the pipeline in the body of water as the pipeline is constructed; and propelling a train, configured to plug the pipeline, in steps inside the pipeline laid on the bed of the body of water; the step travel of the train being related to the position of the thicker pipe sections, and to the touchdown point of the pipeline on the bed of the body of water.

17 Claims, 4 Drawing Sheets

(51) Int. Cl.
  *F16L 55/128* (2006.01)
  *B63B 35/03* (2006.01)
  *F16L 55/26* (2006.01)

(56) References Cited

U.S. PATENT DOCUMENTS

| | | | |
|---|---|---|---|
| 3,768,269 A * | 10/1973 | Broussard et al. | 405/168.2 |
| 3,837,214 A * | 9/1974 | Guest | 73/40.5 R |
| 3,911,689 A * | 10/1975 | Hogan | 405/166 |
| 3,940,855 A * | 3/1976 | Ver Nooy et al. | 33/544 |
| 3,943,982 A * | 3/1976 | Lecordier | 138/89 |
| 3,977,201 A * | 8/1976 | Bittner | 405/170 |
| 3,978,678 A * | 9/1976 | Duncan et al. | 405/171 |
| 4,360,290 A * | 11/1982 | Ward | 405/170 |
| 4,498,811 A * | 2/1985 | Fern et al. | 405/168.1 |
| 4,992,001 A * | 2/1991 | Harrison | 405/166 |
| 2002/0006314 A1* | 1/2002 | Willis | 405/168.2 |
| 2004/0013471 A1* | 1/2004 | Matthews | 405/154.1 |
| 2004/0062611 A1* | 4/2004 | Endal | 405/168.1 |
| 2004/0261873 A1* | 12/2004 | Syse et al. | 138/91 |

OTHER PUBLICATIONS

Notification Concerning Submission, Obtention or Transmittal of Priority Document (Form PCT/IB/304) for International Application No. PCT/IB2012/051725 dated Jul. 10, 2012.

* cited by examiner

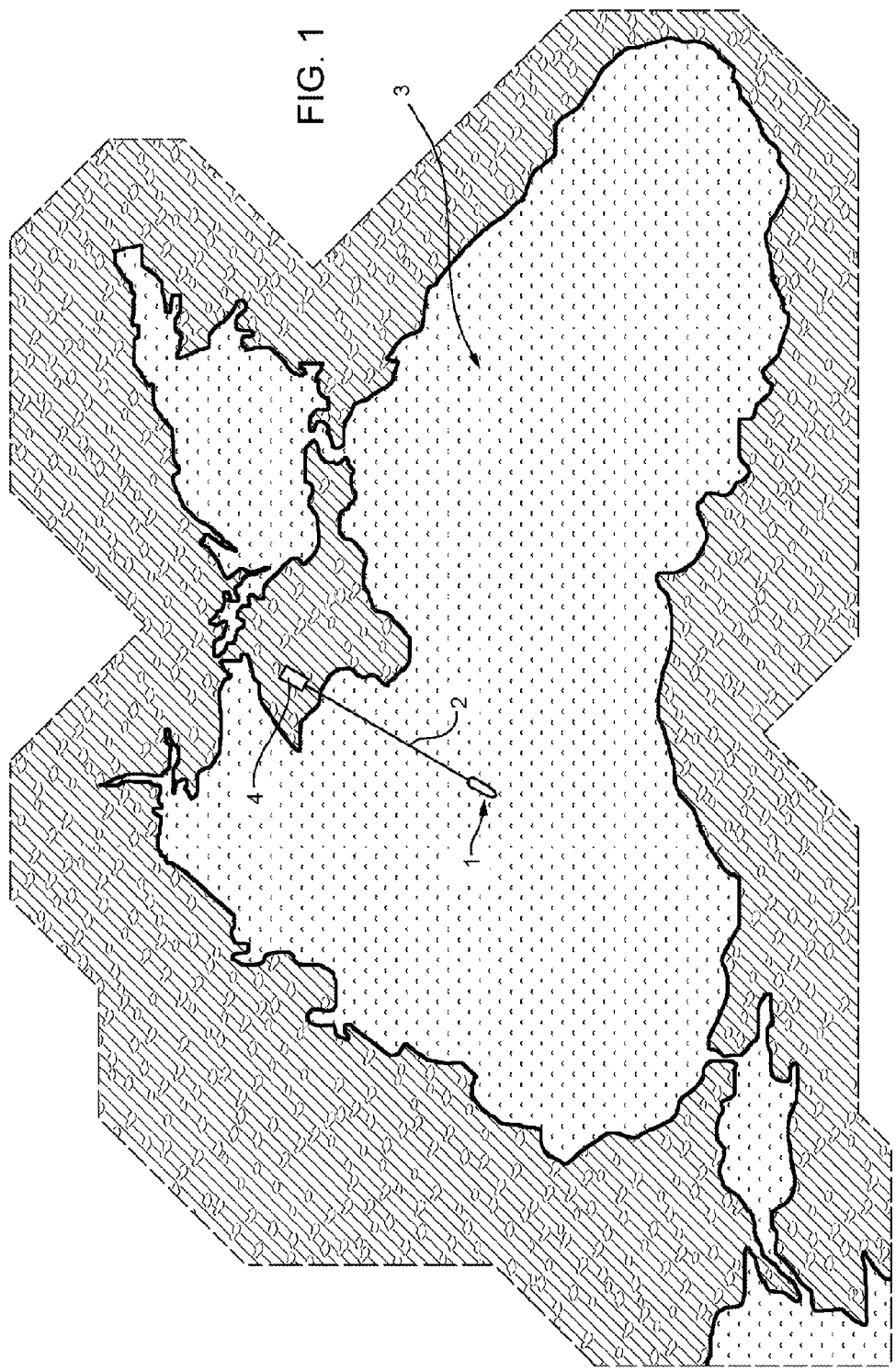

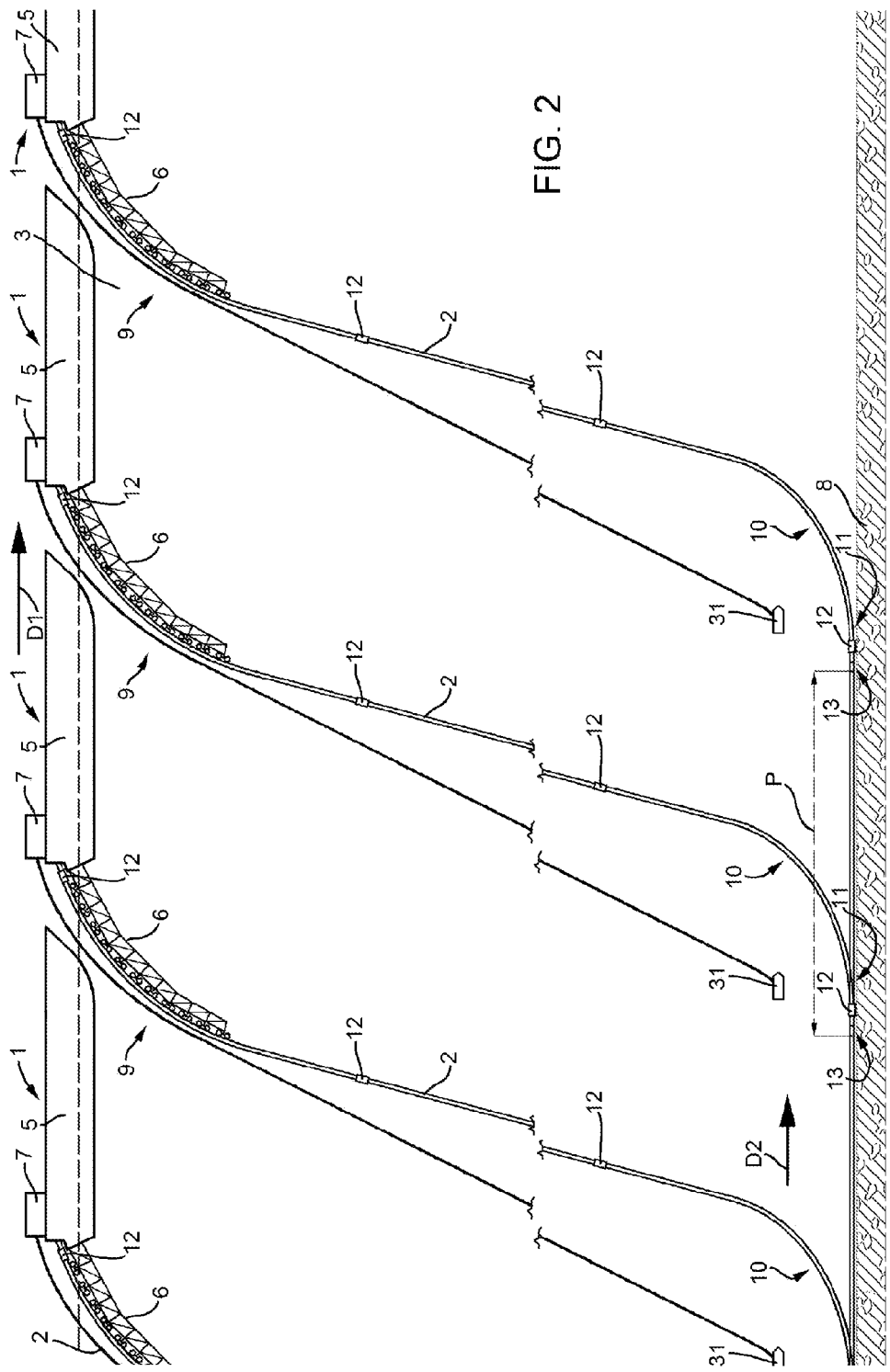

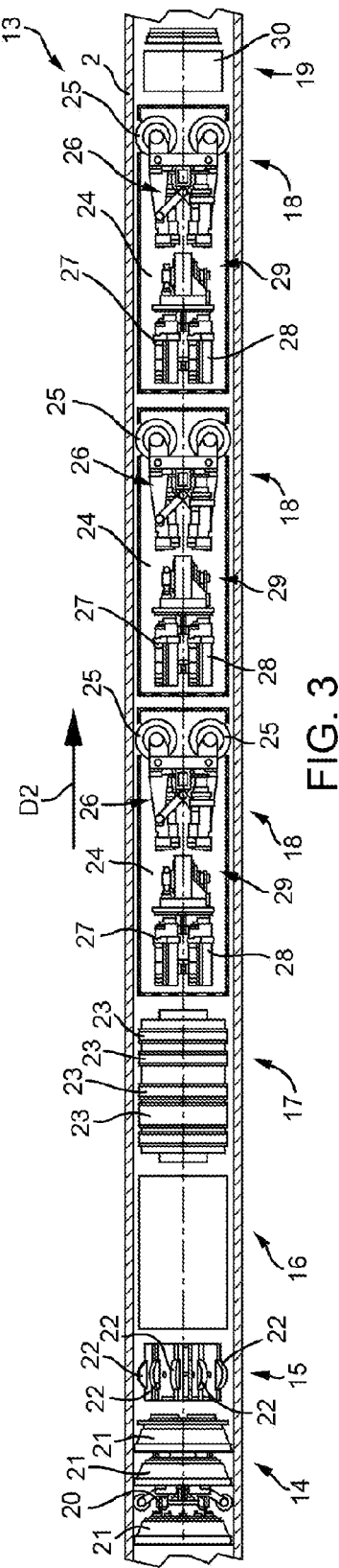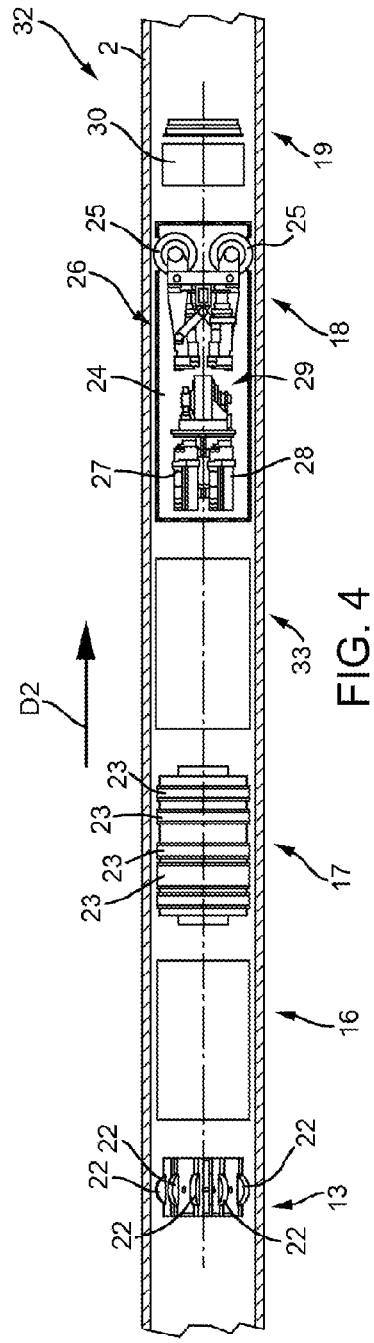

METHOD AND SYSTEM FOR LAYING A PIPELINE ON THE BED OF A BODY OF WATER

PRIORITY CLAIM

This application is a national stage application of PCT/IB2012/051725, filed on Apr. 6, 2012, which claims the benefit of and priority to Italian Patent Application No. MI2011A000565, filed on Apr. 6, 2011, the entire contents of which are each incorporated by reference herein.

BACKGROUND

Pipelines are constructed and laid using various types of laying vessels, depending on the depth of the bed. One type of vessel, suitable for relatively shallow beds, is configured to join pipe sections on a substantially horizontal assembly line, and is equipped with a so-called S-lay ramp—named after the shape the pipeline assumes between the laying vessel and the bed. Another type of vessel, suitable for deep beds, is configured to join pipe sections on a substantially vertical assembly line, and is equipped with a so-called J-lay ramp—also named after the shape the pipeline assumes between the laying vessel and the bed.

In both cases, the portion of the pipeline between the laying vessel and the bed is subjected to bending stress (i.e., forms one curve using the J-lay system, and two curves using the S-lay system). Until it is actually put into operation, the pipeline is obviously empty, so the external pressure, particularly in deep water, is much higher than inside the pipeline. Pipelines may be laid at depths of as much as 3000 meters (9842.52 feet) below sea level, so sharp curves combined with the difference between the external and internal pressure may crush and rupture the pipeline, thus resulting in flooding, which has serious consequences. In particular, at least part of the pipeline is irreparably damaged and must be replaced; and clearing the flooded pipeline is an expensive, extremely time-consuming job.

One known solution to the problem is to insert and move a plug along the pipeline, to prevent the portion of the pipeline upstream from the plug from flooding as the pipeline is eased onto the bed.

The plug is moved along the pipeline using various techniques. For example, in documents U.S. Pat. No. 4,498,811 and PCT Patent Application No. WO 03/042594, it is drawn along using a cable inserted inside the pipeline and operated by a winch on the laying vessel. In another technique known as pigging, the plug is blown along by compressed air generated at a pumping station, for example located at one end of the pipeline. In document PCT Patent Application No. WO 2007/040403, the plug is moved along the pipeline by the difference in pressure up and downstream from the plug. In another technique, the plug is associated with a self-propelled carriage, but this requires an independent power source, as described in documents U.S. Pat. No. 3,837,214 and U.S. Pat. No. 3,978,678.

Each of the above plugging techniques has pros and cons in terms of plug positioning precision, operating range, cost, production and installation.

Moreover, the methods in the above documents are ineffective in preventing crushing of the pipeline from spreading and so endangering the integrity of a large section of the pipeline and the plug, and the sealing capacity of the plug.

SUMMARY

The present disclosure relates to a method of laying a pipeline on the bed of a body of water. More specifically, the method according to the present disclosure comprises the steps of constructing the pipeline on a laying vessel, and laying the pipeline in the body of water, and is configured to minimize any damage caused by rupture of the pipeline as it is being laid.

It is an advantage of the present disclosure to provide a method of laying a pipeline on the bed of a body of water, configured to minimize damage caused by local rupture of the pipeline as it is being laid.

According to the present disclosure, there is provided a method of laying a pipeline on the bed of a body of water, the method comprising the steps of constructing, on a laying vessel, a pipeline comprising pipe sections of a designated or given thickness, and thicker pipe sections distributed along the pipeline; moving the laying vessel forward and laying the pipeline in the body of water as the pipeline is constructed; and propelling a train, configured to plug the pipeline, inside the pipeline laid on the bed of the body of water; travel of the train being related to the position of the thicker pipe sections, and to the touchdown point of the pipeline on the bed of the body of water.

In the present disclosure, the thicker pipe sections distributed along the pipeline prevent any crushing of the pipeline from spreading; the train prevents the pipeline from flooding; and the position of the train is selected according to the position of the thicker pipe sections and the pipeline touchdown point, to protect the longest possible section of pipeline from crushing and flooding, and at the same time protect the train.

The method, in fact, provides for determining the position of the train inside the pipeline, and the position of the thicker pipe section with respect to the touchdown point.

In one embodiment of the disclosure, the method provides for positioning the train directly upstream from the last thicker pipe section laid on the bed of the body of water.

In other words, the train is moved forward in steps, each substantially equal to the distance between two consecutive thicker pipe sections. In certain embodiments, the thicker pipe sections are equally spaced, and the train advances in stop-go fashion.

In one embodiment, the method provides for automatically plugging the pipeline utilizing the train in the event the pipeline floods as it is laid. That is, the pipeline is only plugged when necessary, which has the advantage of preventing the train from adhering to the pipeline and so being difficult to move off again.

In another embodiment, the method provides for controlling the train utilizing electromagnetic waves directed into the pipeline, between the train and a control unit on board the laying vessel.

In one embodiment of the disclosure, the step of propelling the train comprises feeding pressurized fluid into the pipeline, from a low-pressure pumping station located at the end of the pipeline opposite the end of the pipeline on board the laying vessel, to push the train forward.

A low-pressure pumping station is enough to move the train forward, and is relatively cheap compared with the high-pressure pumping station normally used for testing pipelines. Tests show 0.5-bar pressure is enough to propel the train, and 1-bar pressure is enough to overcome static friction to get the stationary train moving.

In one embodiment of the disclosure, the method provides for propelling and braking the train utilizing a self-propelled module on the train itself. With a self-propelled module, the train can be propelled and braked using either the self-propelled module on its own, without the pumping station, or using a combination of the two. The combination mode is particularly advantageous when starting or stopping the train. When starting, the static friction of the train is overcome by the self-propelled module, so a pumping station configured to produce relatively low pressure inside the pipeline can be installed. And, when stopping or moving forward, the self-propelled module brake provides for accurately positioning the train with respect to the thicker pipe section, and configured to control the travelling speed of the train.

The combination mode may be limited to starting and stopping the train, so power consumption of the self-propelled module is relatively low.

In one embodiment of the disclosure, the method provides for recovering kinetic energy when braking, converting kinetic energy to electric power, accumulating electric power, and converting electric power back to kinetic energy to start the train. By recovering energy, a relatively compact, lightweight power battery can be used.

The present disclosure also relates to a system configured to lay a pipeline on the bed of a body of water, configured to minimize damage caused by rupture of the pipeline as it is being laid.

According to the present disclosure, there is provided a system configured to lay a pipeline on the bed of a body of water, the system comprising a laying vessel configured to construct a pipeline comprising pipe sections of a designated or given thickness, and thicker pipe sections distributed along the pipeline; a laying ramp configured to lay the pipeline in the body of water as the laying vessel moves forward; a train configured to move along the inside of the pipeline and to plug the pipeline when necessary; and a control unit configured to control travel of the train on the basis of the position of the thicker pipe sections and the touchdown point of the pipeline on the bed of the body of water.

More specifically, the train comprises modules selected from a quantity or number of modules and connected in succession to one another; the train comprising at least one module configured to propel the train; at least one module configured to plug the pipeline; at least one module configured to control the module for plugging the pipeline; at least one module which acts as a parking brake for the train; and at least one module configured to transmit/receive data between the train and the control unit on the laying vessel.

The modular configuration of the train enables different types of trains to be formed by inserting or removing modules, or using multiple modules with the same function on the same train. This versatility is particularly advantageous in terms of maintenance and operation.

Additional features and advantages are described in, and will be apparent from the following Detailed Description and the figures.

BRIEF DESCRIPTION OF THE DRAWINGS

A number of non-limiting embodiments of the disclosure will be described by way of example with reference to the accompanying drawings, in which:

FIG. 1 shows a plan view, with parts removed for clarity, of a laying vessel laying a pipeline in a body of water;

FIG. 2 shows a side view, with parts removed for clarity, of the FIG. 1 laying vessel in successive pipeline laying positions;

FIG. 3 shows a side view, with parts removed for clarity, of a component by which to implement the method according to the present disclosure;

FIG. 4 shows a side view, with parts removed for clarity, of an alternative embodiment of the FIG. 3 component;

DETAILED DESCRIPTION

Figure 5:
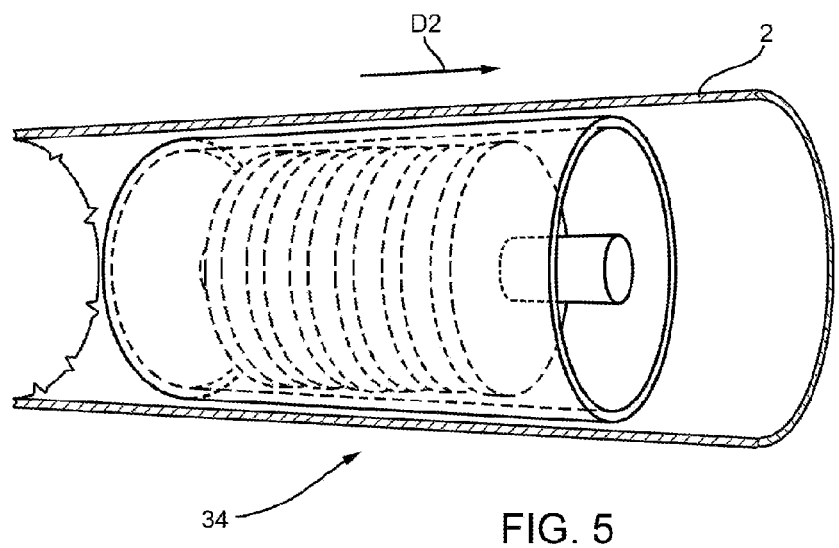
FIG. 5 shows a larger-scale, partly sectioned view in perspective of a detail of a variation of the FIG. 3 component.

Referring now to the example embodiments of the present disclosure illustrated in FIGS. 1 to 6, number 1 in FIG. 1 indicates as a whole a laying vessel laying a pipeline 2 in a body of water 3. Pipeline 2 is laid, as it is constructed, by laying vessel 1 in body of water 3, and extends between laying vessel 1 and a land-based pumping station 4.

FIG. 2 shows laying vessel 1 and pipeline 2 in successive positions, as laying vessel 1 moves in a direction D1 along a designated or given course, and pipeline 2 is constructed piece by piece on board laying vessel 1. FIG. 2 shows an S-lay vessel 1, though the present disclosure also applies to J-lay vessels.

Laying vessel 1 is shown schematically, and comprises a floating structure 5 supporting a laying ramp 6 partly immersed in body of water 3 to partly guide pipeline 2 coming off supporting structure 5; and a control unit 7 configured to control the laying operation.

In the example shown in the drawings, pipeline 2 assumes the characteristic S shape between laying vessel 1 and the bed 8 of body of water 3, forms two curves 9 and 10, is supported by laying ramp 6 along curve 9, and is unsupported along curve 10, which is located close to bed 8 or, rather, the touchdown point 11 of pipeline 2 on bed 8. Touchdown point 11 shifts rightwards in FIG. 2, as laying vessel 1 moves in direction D1.

Pipeline 2 is made of individual pipe sections of a designated or given thickness, joined to one another (and not indicated in the drawings); and of thicker pipe sections 12, which are more resistant to bending and crushing, and so prevent any accidental crushing of pipeline 2 from spreading. In one embodiment, thicker pipe sections 12 are equally spaced along pipeline 2, but the spacing may vary, if necessary, and in one example, ranges between 500 meters (1640.42 feet) and 5000 meters (16404.2 feet). Pipeline 2 houses a train 13 configured to plug pipeline 2 in the event of accidental flooding. Since the areas of pipeline 2 most likely to fail and flood are in the part suspended between laying vessel 1 and bed 8, train 13 serves to prevent flooding of the portion of pipeline 2 lying on bed 8, and is therefore moved gradually forward inside pipeline 2 in a direction D2 as laying vessel 1 advances in direction D1. The terms 'upstream' and 'downstream' used herein refer to the travelling direction D2 of train 13. Train 13 is moved forward on the basis of the absolute position of touchdown point 11 and the position of the last thicker pipe section 12 laid on bed 8, is advanced in steps P, each substantially equal to the distance between the last two thicker pipe sections 12 laid on bed 8, and is stopped directly upstream from the last thicker pipe section 12 laid on bed 8. This travelling mode of train 13 reduces any damage caused by failure or flooding of pipeline 2, by train 13 always being located in a position protected by the last thicker pipe section 12, which prevents pipeline 2, and therefore train 13, from being crushed.

In certain embodiments of the method according to the disclosure, train 13 must be positioned relatively accurately inside pipeline 2, and it is necessary to monitor, or at least accurately determine, the position of touchdown point 11 of pipeline 2 on bed 8, the position of the thicker pipe sections 12 next to touchdown point 11, and the position of train 13.

As shown in FIG. 3, train 13 is configured to travel in a direction D2, and comprises a quantity or number of substantially cylindrical modules 14, 15, 16, 17, 18, 19 connected successively in direction D2. Module 14 is known as a 'pig', and comprises a carriage 20; and cup-shaped seals 21 configured to push train 13 in direction D2 as a function of the pressure upstream from module 14. Module 15 acts as a parking brake when train 13 is stopped, and has wheels 22 which roll along the surface of pipeline 2 when train 13 is moving, and are locked when train 13 is stopped. Module 16 substantially defines the control unit of module 17, which acts as a plug and has inflatable bladders 23 configured to adhere to the inner surface of pipeline 2. Each module 18 is a self-propelled module, comprises a supporting frame 24, drive wheels 25, a mechanical transmission 26, an electric motor 27, and a power battery 28, and, in one embodiment, comprises an energy recovery device 29 configured to recover kinetic energy when braking, convert kinetic energy to electric power, and at least partly recharge battery 28. In other words, electric motor 27 acts as an electric generator when braking.

Module 19 is located at the front of train 13, and comprises a transmitting/receiving unit 30 configured to signal the position of train 13, the charge of battery 28, and any operating anomalies, and configured to receive control signals from laying vessel 1.

As shown in FIG. 2, the position of touchdown point 11 and the laying of thicker pipe sections 12 are monitored by a remotely operated vehicle 31 ("ROV"), which assists the laying operation directly over bed 8 of body of water 3.

In actual use, control unit 7 controls travel of train 13 inside pipeline 2 on the basis of the information received from ROV 31 and module 19. More specifically, control unit 7 knows the current position of train 13, and, utilizing ROV 31, monitors the progress of touchdown point 11 as laying vessel 1 moves forward, and the laying of thicker pipe section 12 on bed 8 of body of water 3. And, each time a thicker pipe section 12 is laid on bed 8, control unit 7 commands train 13 to move into position directly upstream from and close to the last-laid thicker pipe section 12.

In a variation not shown, the laying vessel is equipped with sonar configured to determine the position of the touchdown point and the thicker pipe sections.

The position of touchdown point 11 and thicker pipe sections 12 can be determined fairly accurately using a mathematical physical model, and as a function of the characteristics of pipeline 2, the topography of bed 8 of body of water 3, the course of laying vessel 1, and the configuration of ramp 6.

In one embodiment, ROV 31 and module 19 communicate directly to determine the stop position of train 13.

All the above control features may be used either singly or in combination with one another.

Number 32 in FIG. 4 indicates an alternative embodiment of the FIG. 3 train. Travel of train 32 not being based on the difference in pressure up and downstream, pumping station 4 in FIG. 1 is not needed. Train 32 has no module 14 (FIG. 3), and comprises modules 15, 16, 17, 18, 19 as described above, and a module 33 configured to power self-propelled module 18. Unlike train 13 in FIG. 3, train 32 comprises only one self-propelled module 18 powered by module 33, which is, in one embodiment, a fuel-cell battery capable of storing a large amount of energy, so train 32 has a fairly good operating range.

By way of an alternative to module 14 in FIG. 3, train 13 may be propelled using a low-drag module 34 (FIG. 5) configured not to adhere to the pipeline. Module 34, in fact, forms a narrow annular gap with pipeline 2, and propulsion is provided by the difference in pressure up and downstream from module 34.

Figure 6:
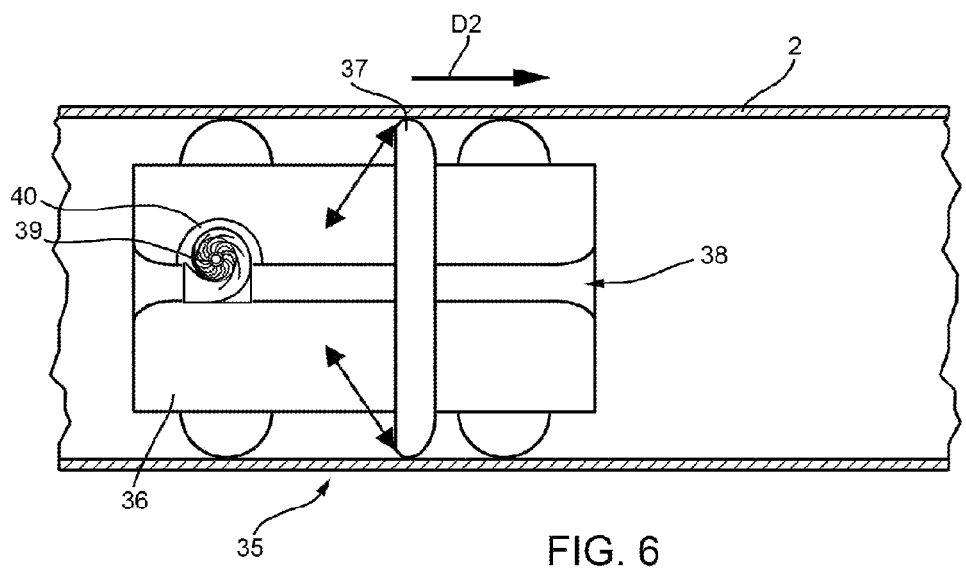
FIG. 6 shows a partly sectioned schematic of a detail of a further variation of the FIG. 3 component.

Number 35 in FIG. 6 indicates an electric generator module configured to increase the operating range of train 32 in FIG. 4, and which comprises a carriage 36; a selectively inflatable/deflatable annular bladder 37 surrounding carriage 36; a longitudinal conduit 38 inside carriage 36; a turbine 39 along conduit 38; and an electric generator 40 associated with turbine 39. Module 35 is obviously configured to operate in a pipeline 2 associated with the pumping station in FIG. 1. When module 35 is stopped in a designated or given position, annular bladder 37 is inflated to force air along conduit 38 to rotate turbine 39 and generate electric power with generator 40.

Module 35 provides for powering train 32 (FIG. 4) remotely (i.e., from the pumping station), relatively easily, thus enabling a reduction in the size and weight of module 33 (FIG. 4).

Clearly, changes may be made to the embodiment described of the present disclosure without, however, departing from the scope of the accompanying Claims. That is, various changes and modifications to the presently disclosed embodiments will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method of laying a pipeline on a bed of a body of water, the method comprising:
constructing, on a laying vessel, a pipeline including: (i) a plurality of first pipe sections of a first thickness, and (ii) a plurality of spaced apart second pipe sections of a second, greater thickness;
moving the laying vessel forward and laying the pipeline in the body of water as the pipeline is constructed; and
moving a train, configured to plug the pipeline, inside the pipeline laid on the bed of the body of water, wherein movement of the train being related to a position of at least one of the second pipe sections and related to a touchdown point of the pipeline on the bed of the body of water.

2. The method of claim 1, which includes determining: (i) a position of the train inside the pipeline, and (ii) the position, with respect to the touchdown point, of the second pipe section within a designated distance of the touchdown point.

3. The method of claim 1, which includes positioning the train directly upstream from the last second pipe section laid on the bed of the body of water.

4. The method of claim 1, which includes automatically plugging the pipeline utilizing the train in an event the pipeline floods as at least one of the pipe sections is laid.

5. The method of claim 1, which includes controlling the train utilizing electromagnetic waves directed into the pipeline between the train and a control unit of the laying vessel.

6. The method of claim 1, which includes feeding pressurized fluid into the pipeline from a low-pressure pumping station located at an end of the pipeline opposite an end of the pipeline on board the laying vessel.

7. The method of claim 1, which includes moving and braking the train utilizing a self-propelled module of the train.

8. The method of claim 1, which includes: (i) recovering kinetic energy when braking the train, and (ii) converting the recovered kinetic energy to electric energy to move the train.

9. A pipeline laying system comprising:
- a laying vessel configured to construct a pipeline including: (i) a plurality of first pipe sections of a first thickness, and (ii) a plurality of spaced apart second pipe sections of a second, greater thickness;
- a laying ramp configured to lay the pipeline in a body of water as the laying vessel moves forward;
- a train configured to move inside of the pipeline and configured to be activated to plug the pipeline; and
- a control unit configured to control movement of the train based on a position of at least one of the second pipe sections and a touchdown point of the pipeline on a bed of the body of water.

10. The pipeline laying system of claim 9, wherein the control unit is configured to determine: (i) a position of the train inside the pipeline, and (ii) a position of each second pipe section with respect to the touchdown point.

11. The pipeline laying system of claim 10, which includes a remotely operated vehicle configured to determine: (i) a position of the touchdown point, and (ii) the position of the second pipe section within a designated distance of the touchdown point.

12. The pipeline laying system of claim 9, wherein the train includes a plurality of modules connected in succession to one another, at least one of the modules configured to move the train, at least one of the modules configured to plug the pipeline, at least one of the modules configured to control the module configured to plug the pipeline, at least one of the modules configured to stop any movement of the train, and at least one of the modules configured to transmit/receive data between the train and the control unit.

13. The pipeline laying system of claim 12, which includes a low-pressure pumping station connected to an end of the pipeline opposite an end of the pipeline on board the laying vessel, wherein the train includes a train propulsion module configured to employ any difference in pressure upstream and downstream from the train.

14. The pipeline laying system of claim 13, wherein the train propulsion module includes a carriage and at least one cup-shaped gasket fitted to the carriage and configured to prevent airflow downstream from the train propulsion module.

15. The pipeline laying system of claim 12, wherein the train includes: (i) a pipeline plugging module including at least one inflatable bladder configured to selectively plug the pipeline and (ii) a control module configured to control the pipeline plugging module.

16. The pipeline laying system of claim 12, wherein the train includes at least one self-propelled module including a plurality of drive wheels contacting the pipeline and an electric motor.

17. The pipeline laying system of claim 16, wherein the at least one self-propelled module includes an energy recovery device configured to recover any kinetic energy of the train when stopping the train and configured to operate the electric motor as an electric generator.

\* \* \* \* \*